(12) United States Patent
Ogawa

(10) Patent No.: US 6,497,935 B1
(45) Date of Patent: Dec. 24, 2002

(54) PHASE-CHANGE OPTICAL INFORMATION RECORDING MEDIUM

(75) Inventor: Ippei Ogawa, Kanagawa (JP)

(73) Assignee: Ricoh Company Ltd., Tokyo (JP)

( * ) Notice: Subject to any disclaimer, the term of this patent is extended or adjusted under 35 U.S.C. 154(b) by 79 days.

(21) Appl. No.: 09/707,206

(22) Filed: Nov. 6, 2000

(30) Foreign Application Priority Data

Nov. 8, 1999 (JP) .......................................... 11-317526

(51) Int. Cl.⁷ ................................................ B32B 3/02
(52) U.S. Cl. ................. 428/64.1; 428/64.5; 430/270.13
(58) Field of Search .............................. 428/64.1, 64.4, 428/64.5, 913; 430/270.13, 495.1, 945; 369/283, 288

(56) References Cited

U.S. PATENT DOCUMENTS 5,818,808 A * 10/1998 Takada ........................ 369/116

OTHER PUBLICATIONS

U.S. application No. 09/471,345, Hattori et al., filed Dec. 23, 1999.
U.S. application No. 09/272,686, Iwasaki et al., filed Mar. 19, 1999.
U.S. application No. 09/199,472, Hattori et al., filed Nov. 25, 1998.
U.S. application No. 09/209,660, Iwasaki et al., filed Dec. 10, 1998.

* cited by examiner

Primary Examiner—Elizabeth Evans
(74) Attorney, Agent, or Firm—Cooper & DunhamLLP

(57) ABSTRACT

A phase-change optical information recording medium including a substrate and a recording layer provided on the substrate, the recording layer including a phase-change recording material capable of recording information, reproducing recorded information, and erasing recorded information reversibly with reversible phase changes in the phase-change recording material, with successive formation of a recording mark with a low reflectivity and a length of at least one unit extending in an optical recording scanning direction, and a space with a high reflectivity and a length of at least one unit extending in the optical recording scanning direction, wherein information is recorded by a plurality of signals being recorded in the recording layer, each signal constituting a recording mark area including a recording initiation marking portion with (a) a length of at least two times a minimum length of the recording mark and (b) a width (W1) of at least 1.1 times an average width (W2) of the other portion of the recording mark area.

13 Claims, 12 Drawing Sheets

LENGTH OF MINIMUM RECORDING MARK

CURVATURE $\theta_2$  $\theta_1$

MOLDED SUBSTRATE

GUIDE GROOVE

TRACK PITCH OF GUIDE GROOVE FOR RECORDING

RELATIONSHIP BETWEEN W1/W2 SHOWN IN FIG. 1A AND 3T SPACE JITTER AFTER 500 TIMES OVERWRITES

RELATIONSHIP BETWEEN (Itop-Ibtmf)/(Itop-Ibtme) SHOWN IN FIG. 1B AND 3T SPACE JITTER AFTER 500 TIMES OVERWRITES RELATIONSHIP BETWEEN THE MECHANICAL
CHARACTERISTIC "CURVATURE" SHOWN IN FIG. 2B
AND THE INNER AND OUTER BLER DIFFERENCE
OF A RECORDING APPARATUS USED RELATIONSHIP BETWEEN MECHANICAL CHARACTERISTIC "INNER AND OUTER TILT" AND THE INNER AND OUTER BLER DIFFERENCE OF RECORDING APPARATUS EMPLOYED RELATIONSHIP BETWEEN THE TRACK PITCH OF GUIDE GROOVE FOR RECORDING AND THE MAXIMUM STORAGE CAPACITY OF THE RECORDING MEDIUM CD-RM

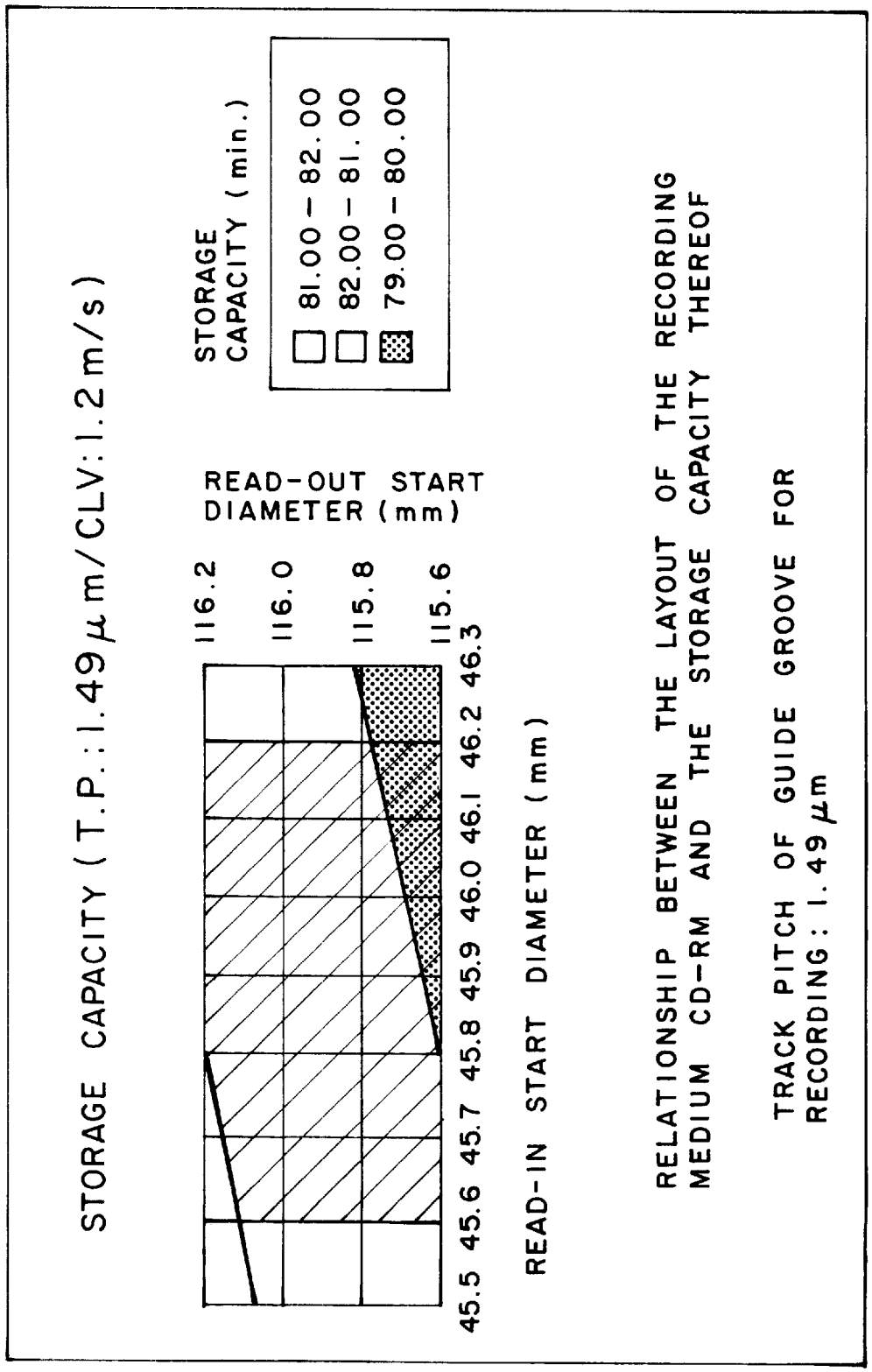

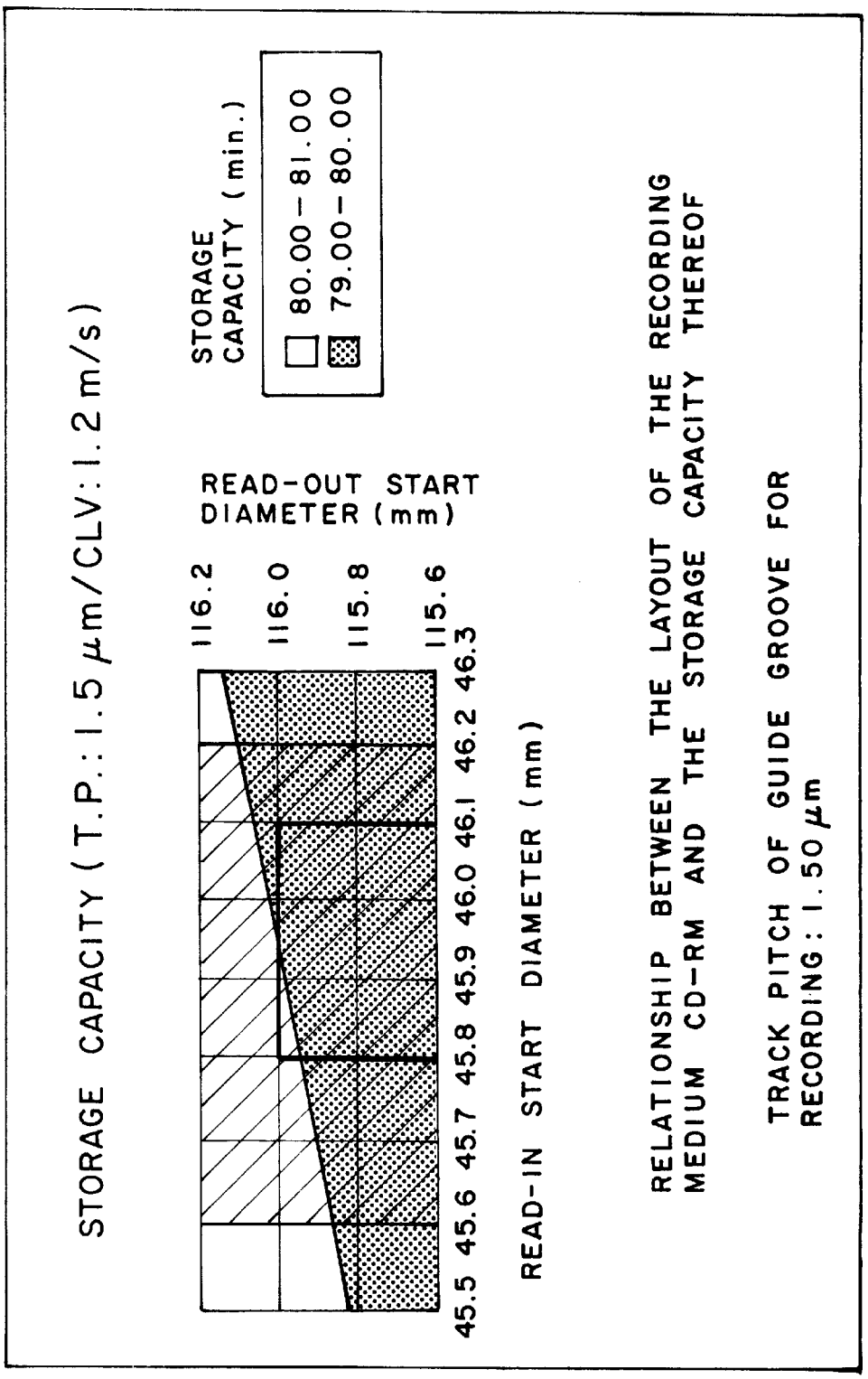

RELATIONSHIP BETWEEN THE DEPTH (Å) OF GUIDE GROOVE FOR RECORDING AND THE SIGNAL CHARACTERISTICS THEREOF

RELATIONSHIP BETWEEN THE THICKNESS OF THE RECORDING LAYER AND THE BLER OF THE RECORDING AND REPRODUCING APPARATUS EMPLOYED

RELATIONSHIP BETWEEN Pe/Pw AND SIGNAL CHARACTERISTICS

PHASE-CHANGE OPTICAL INFORMATION RECORDING MEDIUM

BACKGROUND OF THE INVENTION

1. Field of the Invention

The present invention relates to a phase-change optical information recording medium, which can be employed in optical memory appliances, more particularly to a phase-change optical information recording medium in the form of a rewritable compact disk, which is generally referred to as compact disk CD-RW.

2. Discussion of Background

As one of optical information memory media capable of recording information, reproducing recorded information and erasing the same with the application of magnetic waves such as laser beam thereto, the so-called phase-change optical information recording medium is known, which utilizes reversible phase changes from a crystalline state to an amorphous state and vice versa, or from one crystalline state to another crystalline state and vice versa.

Of such optical information memory media, the phase-change optical information recording media have been particularly subjected to vigorous research and development activities, since "overwrite", which would be extremely difficult to perform in the case of magneto-optical memory media, can be carried out by the phase-change optical information recording media with the application of a single beam thereto, and accordingly the optical system on a drive side for the phase-change optical information is simpler in mechanism than that for the magneto-optical memory media.

Conventionally, CDs (compact disks) have been recording media exclusively for reproducing for use with audio appliances or used as reproducing computer software. However, there have been placed on the market CD-Rewritable (usually abbreviated to CD-R), which is an optical information recording medium in which information can be recorded in the CD format, and CD-ReWritable (usually abbreviated to CD-RW), in which the above-mentioned phase-change material is employed, so that they find a variety of applications in the recording media for computers.

Previously, the standards for the phase-change optical recording media CD-RW (hereinafter simply referred to as DC-RW) were limited only to the recording at 2.4 to 2.8 m/s (2×line velocity recording), corresponding to double speed. As a matter of course, a long recording time is required at such a slow speed line velocity, so that there has been a demand for a rewritable CD capable of recording at much higher speed.

On the other hand, it has also been expected that CD-RW could be used as a 1×line velocity recording medium for use with audio appliances or the like.

In order to meet such various demands for recording applications, there have been demanded and in fact have been developed CD-RW media capable of performing multi-speed recording at a plurality of different line velocities on the same medium, namely, which are capable of performing recording at 2×line velocity and 4×line velocity, and also at 1×line velocity.

However, there is still a strong demand for further the enlargement of an effective range of the recording line velocities, and improvements, in particular, with respect to high quality recording at a low line velocity, and excellent compatibility with recording apparatus.

Furthermore, in the course of such various demands for recording applications, recently there has been developed a CD recorder for audio use. In accordance with the development of the CD recorder, there is increasing a demand for a recording medium which has high overwrite durability at low line velocity recording and is capable of attaining high quality recording.

Conventionally a storage capacity of 74 minutes or less has been mainly used. However, recently, CDs with a storage capacity of more than 74 minutes are increasing, which are for audio use. Under such circumstances, the demand for a recording medium with a larger storage capacity is increasing for backing up such long time recorded CDs.

SUMMARY OF THE INVENTION

In view of the above-mentioned status of the prior art in the field of this technology, a first object of the present invention is to provide a phase-change multi-speed optical information recording medium which is capable of recording at different line velocities, has excellent overwrite durability, with minimized reproduction errors, and which is also capable of attaining high quality signal recordings at low line velocities.

A second object of the present invention is to provide a phase-change multi-speed optical information recording medium which has a larger storage capacity than that in general use, namely, a larger memory capacity than that of a. phase-change optical information recording CD-RW currently in general use.

By use of the phase-change multi-speed optical information recording medium of the present invention, an unconventionally effective recording method can be carried out at a low line velocity recording, with excellent durability to overwrite, and appropriate suitability for recording apparatus used in practice. Furthermore, in the present invention, the layer structure of the recording medium including a substrate structure is so optimized that the storage capacity is maximized.

The above-mentioned objects of-the present invention can be achieved by a phase-change optical information recording medium which comprises a substrate and a recording layer provided on the substrate, the recording layer comprising a phase-change recording material capable of recording information, reproducing recorded information, and erasing recorded information reversibly with reversible phase changes in the phase-change recording material, with successive formation of a recording mark with a low reflectivity and a length of at least one unit extending in an optical recording scanning direction, and a space with a high reflectivity and a length of at least one unit extending in the optical recording scanning direction, wherein information is recorded by a plurality of signals being recorded in the recording layer, each signal constituting a recording mark area including a recording initiation marking portion with (a) a length of at least two times a minimum length of the recording mark and (b) a width (W1) of at least 1.1 times an average width (W2) of the other portion of the recording mark area.

In the above phase-change optical information recording medium, the space, when having a maximum length in terms of the unit, may have a signal level Itop, the recording initiation marking portion may have a signal level Ibtmf, and the other portion of the recording mark area may have a signal level Ibtme, which signal levels rtop, Ibtmf and Ibtme satisfy the formula I:

$$Itop-Ibtmf \geq (Itop-Ibtme)$$

By the thus formed recording mark, recording can be attained with high quality signals with excellent overwrite durability.

Further, in the above phase-change optical information recording medium, the phase-change recording material for the recording layer may comprise constituent elements Ag, In, Sb, Te, and N or O, with the respective composition ratios α, β, γ, δ and ε, in terms of atomic % being:

$0<\alpha \leq 10$ $3 \leq \beta \leq 15$ $50 \leq 65 \leq 65$ $20 \leq \delta \leq 35$ $0 \leq \epsilon \leq 10$, wherein $\alpha+\beta+\gamma+\delta+\epsilon=100$.

By the provision of the recording layer with the above-mentioned-composition, signal recording performance at low line velocity can be further improved, and the compatibility of this recording medium with other recording apparatus and the range of the corresponding line velocities can be significantly enlarged.

In the above-mentioned phase-change optical information recording medium, the information can be recorded in the phase-change recording material with a different recording line velocity which is either a high recording line velocity or a low recording line velocity, the high recording line velocity being at least 1.2 times the low recording line velocity, the low recording line velocity being any of (1) 1.2 m/s to 1.4 m/s, (2) 2.4 m/s to 2.8 m/s, or (3) 4.8 m/s to 5.6 m/s.

By the above-mentioned recording line velocities, high quality recbrding.at low line velocity can be attained, while maintaining the compatibility with conventional CD-RW recording apparatus. Furthermore, the range of the recording velocity corresponding to the CD-RW can be enlarged.

Further, in the above-mentioned phase-change optical information recording medium, the phase-change optical information recording medium may be in the shape of a disk, including a disk-shaped signal recordable area with a diameter of 120 mm or less, which is rotatable round a central rotation axis, with a difference between (1) a displacement in the vertical direction of the central rotation axis of an innermost circumference of the disk-shaped signal recordable area and (2) a displacement in the vertical direction of the central rotation axis of an outermost circumference of the disk-shaped signal recordable area being in a range of 10 μm to 160 μm.

Further, in the above-mentioned phase-change optical information recording medium, the phase-change optical information recording medium may be in the shape of a disk, including a disk-shaped signal recordable area with a diameter of 120 mm or less, which is rotatable round a central rotation axis, wherein when there is formed a TILT angle (θ1) is formed between (1) a flat surface which is positioned with a right angle with respect to the central rotation axis, passing through an inner tangent point on one external surface of the disk-shaped recording medium, which inner tangent point corresponds to a point at the innermost circumference of the disk-shaped signal recordable area, and (2) a tangent at the inner tangent point externally directed in a radius direction of the disk-shaped recording medium, and also when there is formed a TILT angle (θ2) is formed between (1) the flat surface and (3) a tangent at an outer tangent point, which outer tangent point corresponds to a point at the outermost circumference of the disk-shaped signal recordable area, externally directed in the same radius direction as mentioned above of the disk-shaped recording medium, it is preferable that an average difference between the TILT angle (θ1) and the TILT angle (θ2) be in a range of −0.050° to 0.320°, provided at least one of the TILT angle (θ1) or the TILT angle (θ2) may also be at zero.

By the above-mentioned mechanical characteristics of the phase-change optical information recording medium, the recording and reproducing suitability of the recording medium for currently commercially available recording apparatus can be improved, and recording can be performed with high quality signals.

Further, in the above-mentioned phase-change optical information recording medium, it is preferable that the substrate comprise guide grooves with a pitch having a pitch of 1.43±0.3 μm for recording signals in the phase-change recording material.

Further, in the above-mentioned phase-change optical information recording medium, it is preferable that the disk-shaped recording medium have a read-in radius in a range of 45.6 mm to 46.2 mm, and a read-out radius of 116.2 mm or less.

By the formation of the above-mentioned guide grooves, the storage capacity of the phase-change optical information recording medium can be significantly increased, and also the recording and reproducing suitability of the recording medium for currently commercially available recording apparatus can be secured.

Further, in the above-mentioned phase-change optical information recording medium, it is preferable that the substrate comprise guide grooves with a depth of 180 Å to 250 Å for recording signals in the phase-change recording material.

By the above depth of the guide grooves, the storage capacity of the recording medium can be increased, and the deterioration of signals can be prevented.

Further, in the above-mentioned phase-change optical information recording medium, it is preferable that the substrate further comprise guide grooves for recording signals in the phase-change recording material, and that the recording medium further comprise a first protective layer on the substrate, on which first protective layer, there are successively overlaid the recording layer, a second protective layer and a reflection layer, and that the recording layer have a thickness of 180 Å to 250 Å.

By the provision of the recording layer with the above thickness, excellent recording and reproducing performance can be attained at low line velocity recording by use of the currently employed recording and reproducing apparatus.

In the above-mentioned phase-change optical information recording medium, it is preferable that the information be recorded in the phase-change recording material with a different recording line velocity which is either a high recording line velocity or a low recording line velocity, the recording with the low recording line velocity being carried out with such a ratio of an erasing power Pel to a recording power Pwl, that is, Pel/Pwl, being smaller than a ratio of an erasing power Peh to a recording power Pwh, that is, Peh/Pwh, at the time of recording carried out with the high recording line velocity.

Finally, in the above-mentioned phase-change optical information recording medium, it is preferable that the ratio of Pel/Pwl at the low recording line velocity be in the range of 0.3 to 0.5 (0.3≤Pel/Pwl≤0.5).

By setting the ratio of Pel/Pwl at the low line velocity as mentioned above and also by making the ratio of Peh/Pwh smaller than the ratio of Pel/Pwl, the remaining heat in the erased area can be reduced and appropriate mark recording can be attained. As a result, the signal characteristics at low line recording velocity can be improved. Furthermore, excess laser power is not applied to the recording medium, the overwrite characteristics can be appropriately maintained or improved.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 10A and FIG. 10B are graphs showing the relationship between the layout of the recording medium CD-RM and the storage capacity thereof in the present invention.

DESCRIPTION OF THE PREFERRED EMBODIMENTS

In the phase-change multi-speed optical information recording medium of the present invention, the shape of each recording mark is appropriately corrected and improved, so that the overwrite durability of the recording medium is enhanced. Furthermore, the mechanical characteristics of the recording medium are improved so as to be capable of matching with the recording and reproduction performance of currently commercially available recording and reproducing apparatus, thereby making it possible to attain high quality recording performance at low line recording velocities.

Furthermore, with respect to the above-mentioned phase-change multi-speed optical information recording medium CD-RW, the guide grooves for recording signals and the layer structure of the recording medium are so improved that the storage capacity of the recording medium is significantly improved as-well as the recording suitability performance thereof.

In an example of the CD-RW of the present invention, a four-element material comprising Ag, In, Sb and Tb is used as a main component for the recording layer of the DC-RW. This material has extremely excellent recording sensitivity and speed (amorphization) and excellent erasing sensitivity and speed (crystallization), and high erasing ratio, so that is a suitable phase-change material for the recording layer of the phase-change optical information recording medium of the present invention.

In this example of the present invention, recording can be carried out in the range of 1×line velocity to 4×line velocity. In other words, this example is a phase-change optical information recording medium capable of carrying out multi-speed recording.

Furthermore, in the present invention, a low line velocity, that is, 1×line velocity, in the range of 1.2 m/s to 1.4 m/s, and a high line velocity, that is, 2×line velocity, in the range of 2.4 m/s to 2.8 m/s, can be carried out.

Figure 1A:
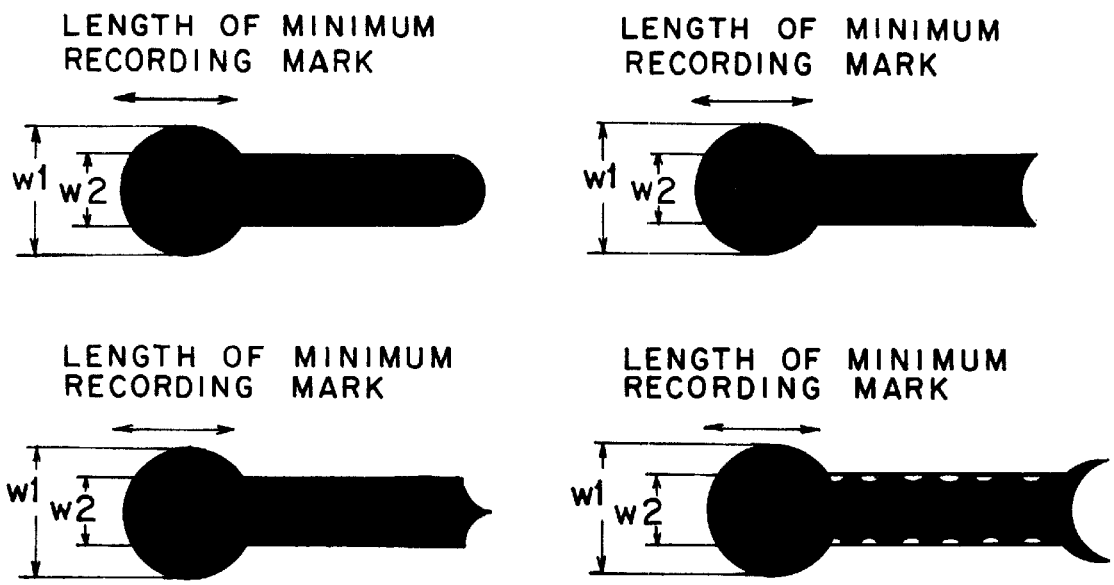
FIG. 1A and FIG. 1B are diagrams in explanation of maximum recording marks and signal amplitudes thereof at a low line recording velocity in a phase-change optical information recording medium of the present invention.
Figure 5:
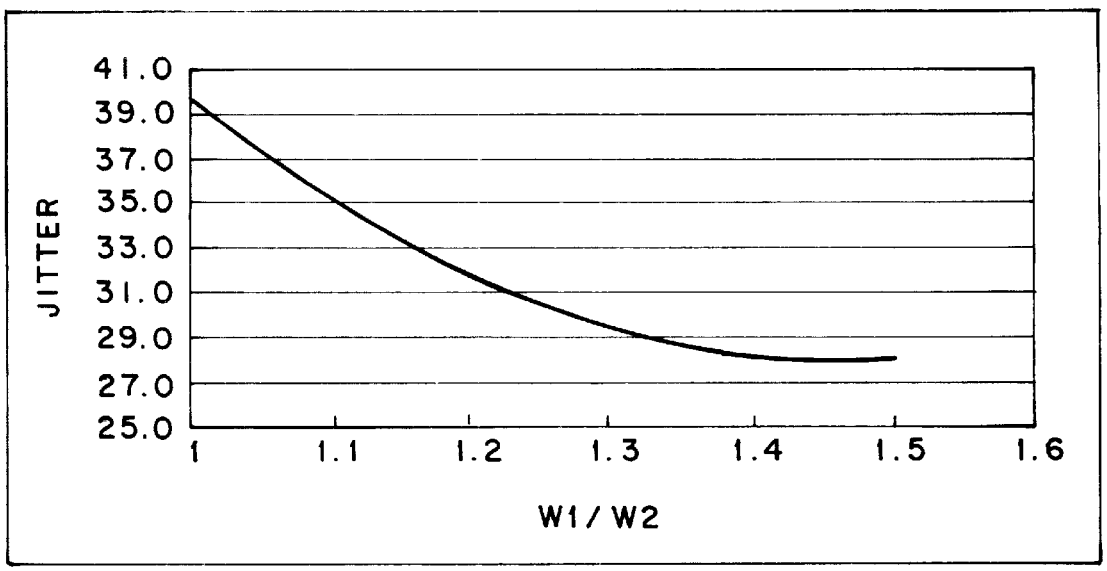
FIG. 5 is a graph showing the relationship between W1/W2 shown in FIG. 1A and 3T Space Jitter after 500 times overwrites.

With reference to the graph shown in FIG. 5, the data of the Jitter of the space are plotted, with the length of the Jitter of the space after direct overwrite was repeated 500 times as ordinate and the ratio of W1/W2 as shown in FIG. 1A as abscissa.

A reproduction apparatus for CD emits a reproduction light beam with a constant scanning speed, so that the length of the mark, the length of the space, and the length of the Jitter can be represented in terms of units of time in which the reproduction light passes. The Jitter is generally used as a criterion of recording quality, When the Jitter is 35 ns or more, the recording quality is considered to be no good.

In the present invention, the shape of the mark was investigated, using a transmission electron microscope. When W1/W2 was less than 1.1, the Jitter of the space after 500 times direct overwrites exceeded 35 ns. This indicates that good recording was not carried out.

Figure 1B:
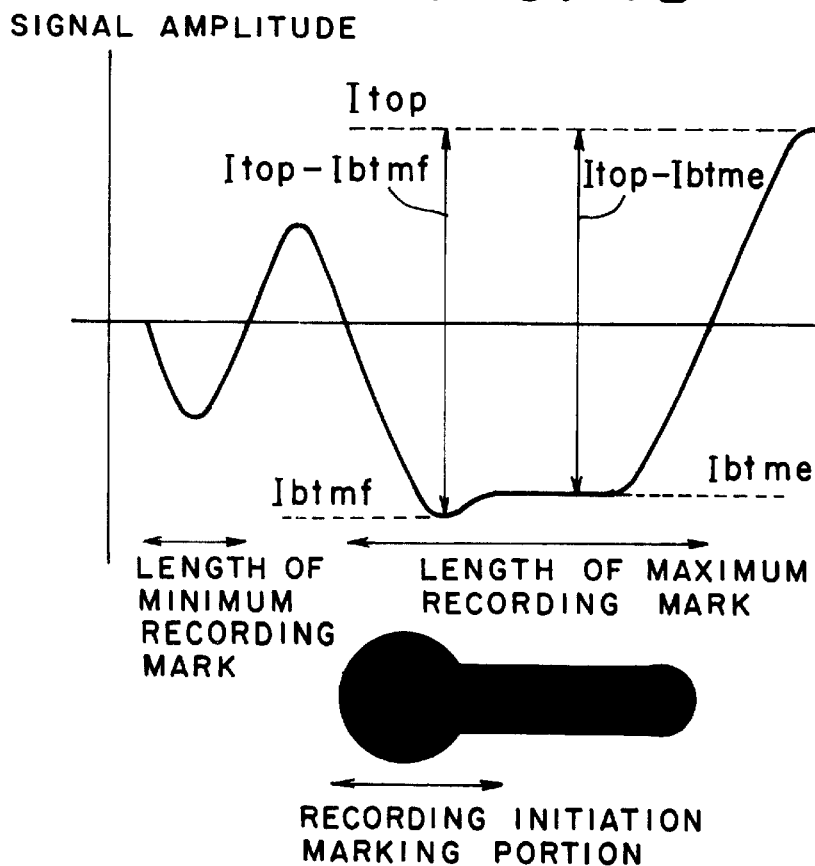
Figure 6:
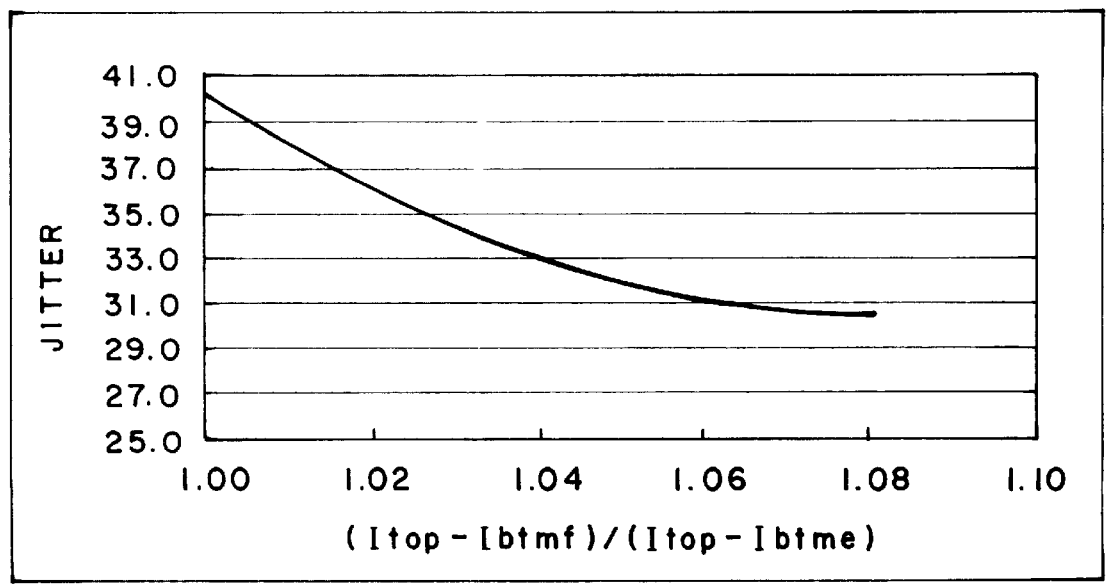
FIG. 6 is a graph showing the relationship between (Itop–Ibtmf)/(Itop–Ibtme) shown in FIG. 1B and 3T Space Jitter after 500 times overwrites.

With reference to the graph shown in FIG. 6, the data of the Jitter of the space are plotted, with the length of the Jitter of the space after direct overwrite was repeated 500 times as ordinate and the ratio of (Itop–Ibtmf)/(Itop–Ibtme) as shown in FIG. 1B as abscissa.

When (Itop–Ibtmf)/(Itop–Ibtme) was less than 1.1, the Jitter of the space after 500 times direct overwrites exceeded 35 ns. This indicates that good recording was not carried out.

Figure 2A:
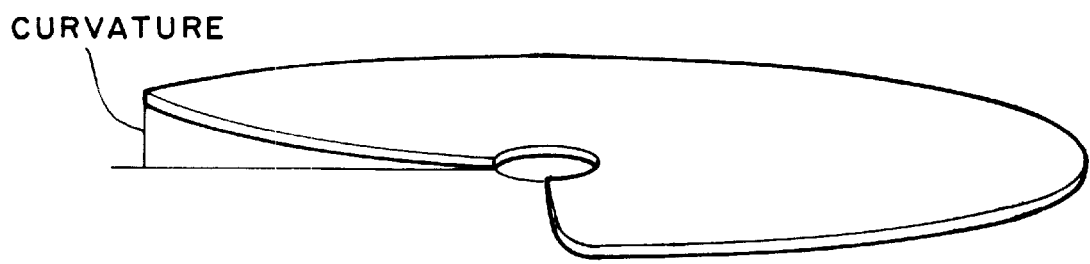
FIG. 2A and FIG. 2B are partially-cut-away schematic perspective views of the phase-change optical information recording medium of the present invention in explanation of the mechanical characteristics thereof.
Figure 2B:
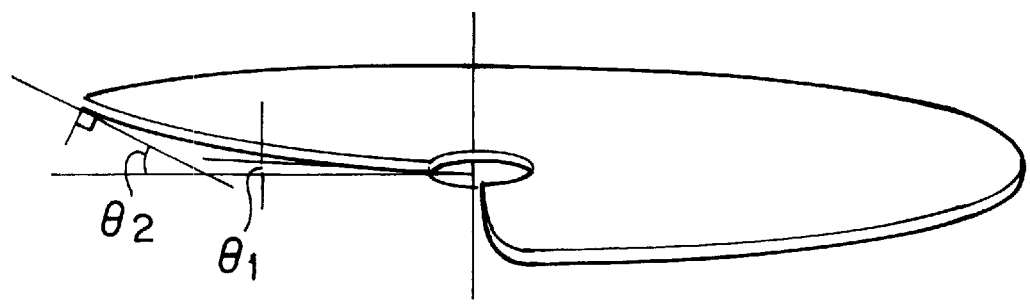
Figure 3:
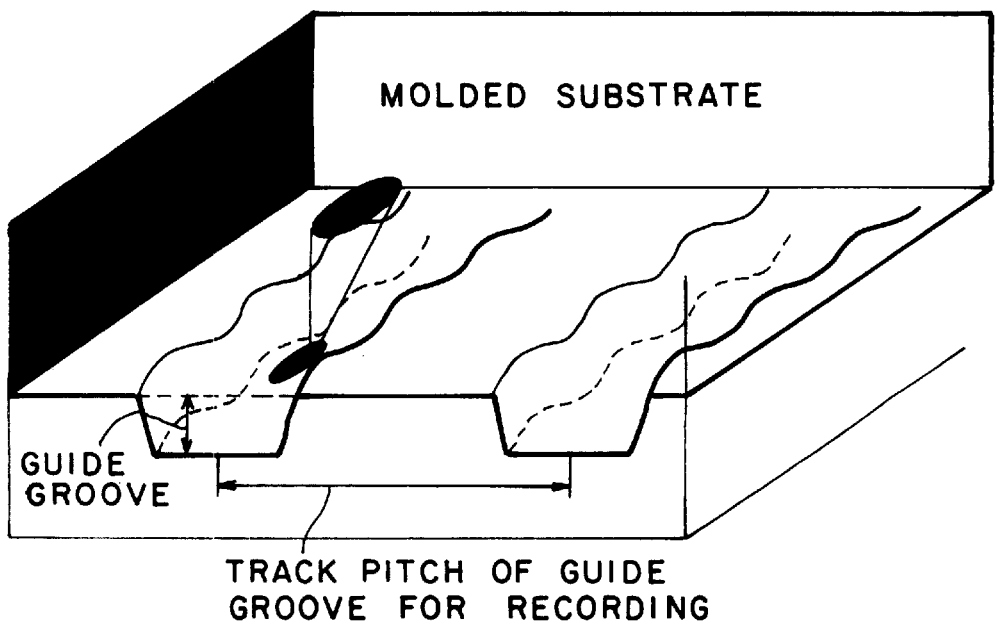
FIG. 3 is a schematic perspective view of the guide grooves for recording, showing the shape thereof, formed in the substrate.
Figure 7:
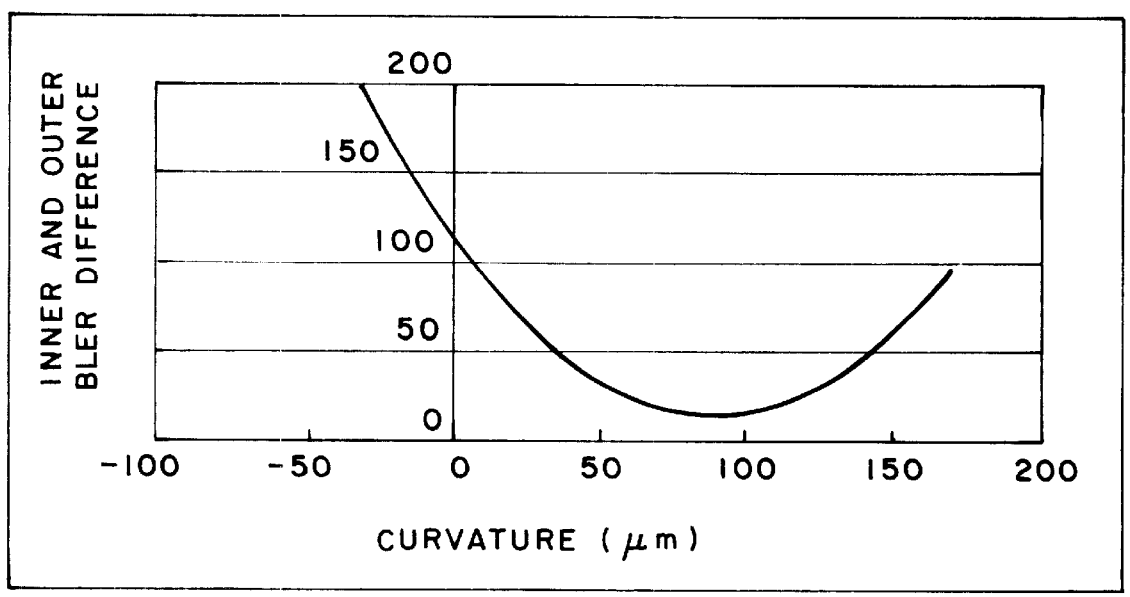
FIG. 7 is a graph showing the relationship between the mechanical characteristic "curvature" of a recording medium CD-RW shown in FIG. 2A and an inner and outer BLER difference of a recording apparatus actually used with the recording medium CD-RW in the present invention.

With reference to the graph shown in FIG. 7, the data of a difference between an inner block error rate (BLER) and an outer block error rate (BLER) of an recording apparatus, which difference is hereinafter referred to as the inner and outer BLER difference, are plotted, with the inner and outer BLER difference as ordinate and the curvature of a CD as shown in FIGS. 2A and 2B as abscissa.

The inner and outer BLER difference here is determined by deducting the BLER at a diameter of 50 mm from the BLER at a diameter of 116 mm. In the present invention, the BLER was directly measured from a decoder equipped in a commercially available CD recorder for audio use. Therefore, the thus measured BLER' values indicate more direct suitability of both the recording medium and the recording apparatus to the recording and reproduction performance, in comparison with the values obtained from RF signals by using a commercially available BLER measurement apparatus.

In view of the in-plane uniformity of signals, it is most desirable that the inner and outer BLER difference be zero. However, when the actual non-uniformity with respect to the recording medium and the recording apparatus is taken into consideration, it is preferable that the inner and outer BLER difference be about 100 or less. In order to attain this, it is preferable that the curvature of the disk medium be in the range of 10 $\mu$m to 160 $\mu$m.

Figure 8:
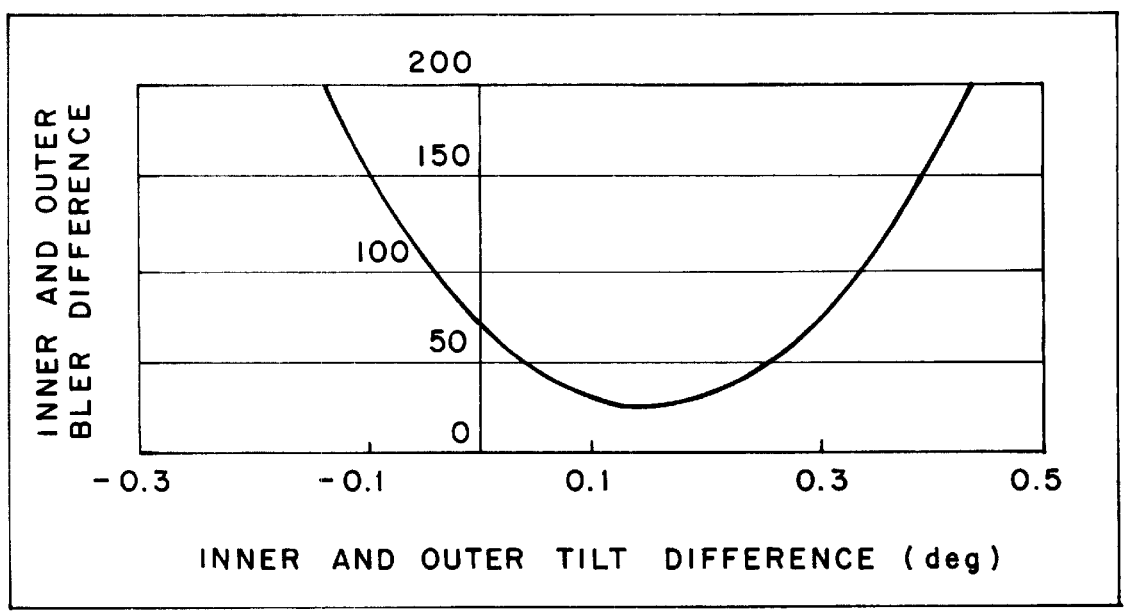
FIG. 8 is a graph showing the relationship between the mechanical characteristic "inner and outer TILT difference" of a recording medium CD-RW and the inner and outer BLER difference of a recording apparatus actually used with the recording medium CD-RW in the present invention.

With reference to the graph shown in FIG. 8, the data of the inner and outer BLER difference of the same recording apparatus as mentioned above are plotted, with the BLER difference as ordinate and the difference between an inner TILT and an outer TILT of the recording medium. When the difference between the inner TILT and the outer TILT of the recording medium, which is hereinafter referred to as the inner and outer TILT difference, is −0.050° or more to 0.32° or less, the value of the inner and outer BLER difference is appropriately 100 or less.

Figure 9:
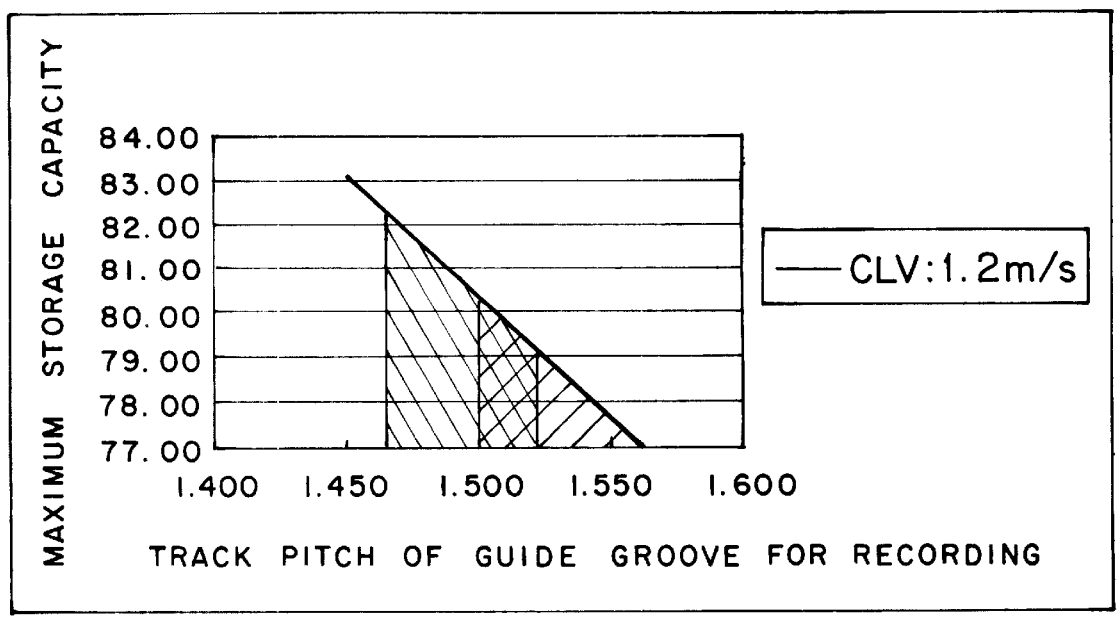
FIG. 9 is a graph showing the relationship between the track pitch of the guide groove for recording and the maximum storage capacity of the recording medium CD-RM of the present invention.

The graph shown in FIG. 9 shows the data with respect to the storage capacity of the CD-RW, plotted with the storage capacity of the CD-RW as ordinate and the track pitch of the guide groove for recording. In the graph shown in FIG. 9, an area shaded with thin oblique lines corresponds to a track pitch area for the standard guide groove for CDs in general use, while an area shaded with thick oblique lines corresponds to a track pitch area for the guide groove for use in the present invention, in which it was confirmed that the operation of a CD-RW with an 80-minute storage capacity was excellent.

FIGS. 10A and 10B are graphs showing the relationship between a read-out start diameter of a CD-RW and a read-in start diameter of the CD-RW, with the data thereof being plotted with the read-out start diameter as ordinate and the read-in start diameter as abscissa. In the graph shown in FIG. 10B, a square area enclosed by the thick line corresponds to a standard area for CDs in general use, while the areas shaded by the oblique lines in both FIGS. 10A and 10B correspond to the areas for use in the present invention. It was confirmed that when the track pitch of the guide groove was set so as to fall within the areas shaded by the oblique lines for use in the present invention, a CD-RW with an 80-minute storage capacity was operable.

Figure 11:
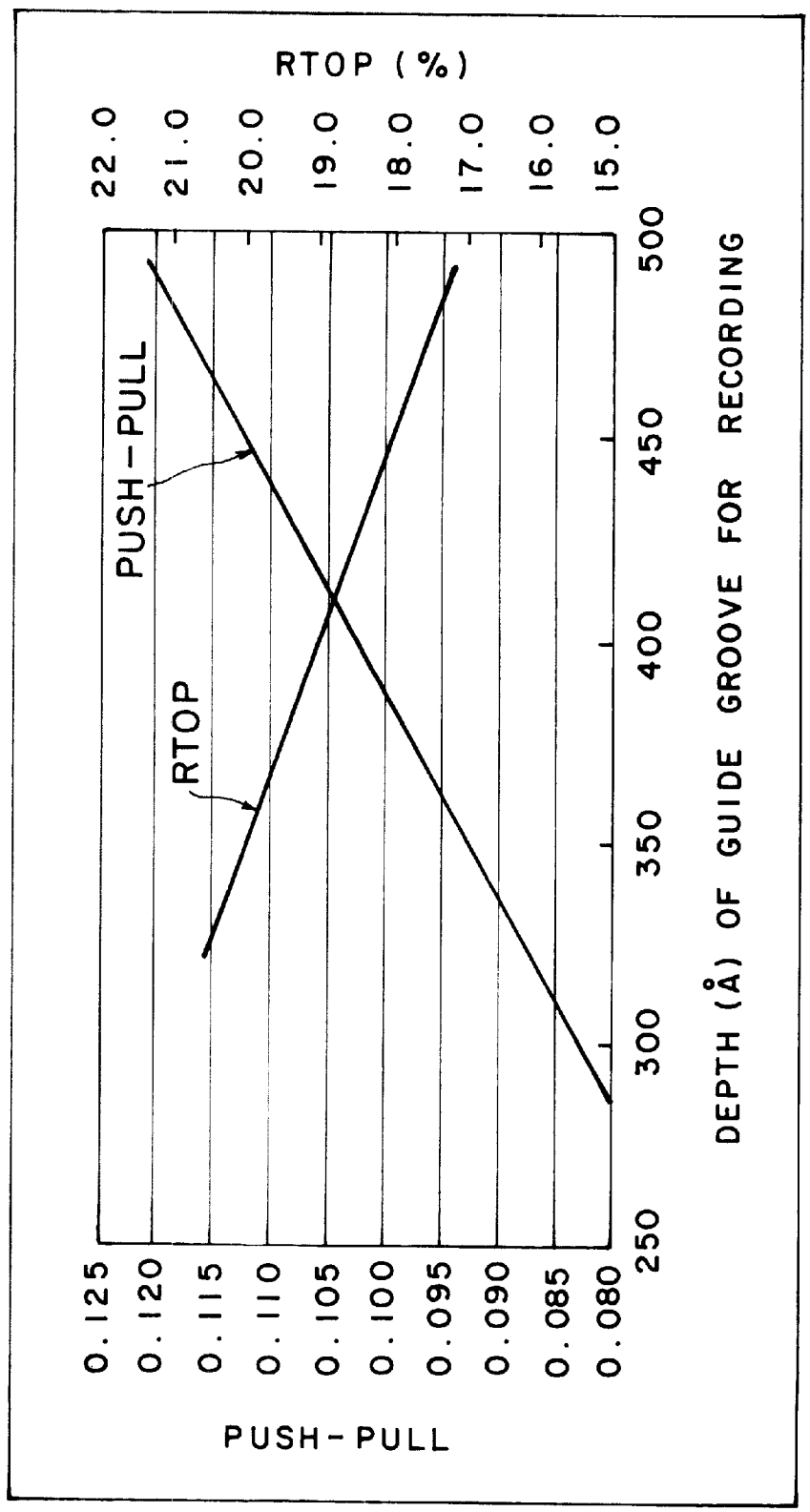
FIG. 11 is a graph showing the relationship between the depth of guide groove for recording and the signal characteristics thereof in the present invention.

FIG. 11 is a graph showing the relationship between the depth (Å) of the guide groove for recording and Push-Pull signals, plotted with the Push-Pull signals as ordinate and the depth (Å) of the guide groove for recording as abscissa. The Push-Pull signals are such signals that cause a laser beam to scan the guide groove, and preferably have a value of 0.08 or more. The graph shown in FIG. 11 also show the relationship between the depth (Å) of the guide groove for recording and Rtop which indicates the value of the reflectivity at the reproduction of recording signals. It is preferable that the value of Rtop be 18% or more.

In view of the above-mentioned conditions, it is preferable that the guide groove have a depth in a range of 300 Å to 450 Å. In the case where the reflectivity is 19% or more, the medium's reproduction matching performance with CD players is improved so that it is more preferable that the guide groove have a depth in a range of 300 Å to 400 Å.

Figure 12:
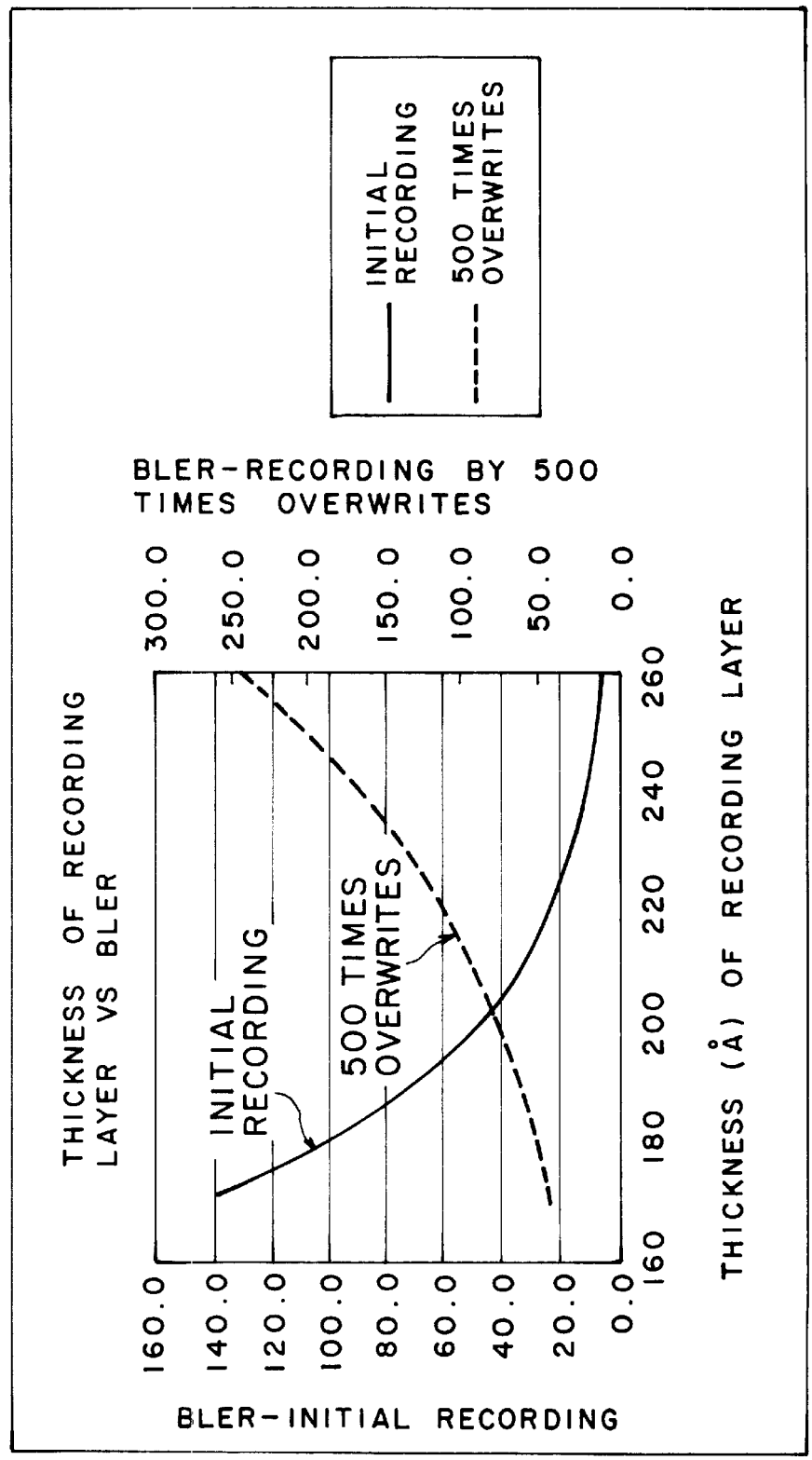
FIG. 12 is a graph showing the relationship between the depth of the recording layer and the BLER of the recording and reproducing apparatus employed.

FIG. 12 is a graph showing the relationship between the thickness of the recording layer of the recording medium and the BLER values of the recording and reproducing apparatus used in practice, plotted with the BLER values as ordinate and the thickness of the recording layer of the recording medium as abscissa. At an initial recording, the thicker the recording layer, the smaller the BLER value, so that the recording and reproduction matching performance of the recording medium with the recording and reproducing apparatus used in practice was better. However, the results shown in the graph indicate that after overwrite was repeated 500 times, the thinner the recording layer, the less the deterioration of the signals by the overwrites.

In accordance with the general standards, it is preferable that the BLER value be 220 or less. However, when the non-uniformity with respect to the recording apparatus and the recording medium used in practice is taken into consideration, it is considered that the BLER value be 200 or less in view of the deterioration of the signals after the overwrites. A suitable thickness of the recording layer, for attaining that the BLER value is 100 or less at the initial recording and that the BLER value is 220 or less, is 180 Å or more to 250 Å or less. When the recording layer has a thickness of 200 Å or more, an effective range for the wavelength of the light for reproduction is so large that the reproduction light, even when its wavelength of 650 nm, has a sufficient signal amplitude for use in practice.

Figure 4:
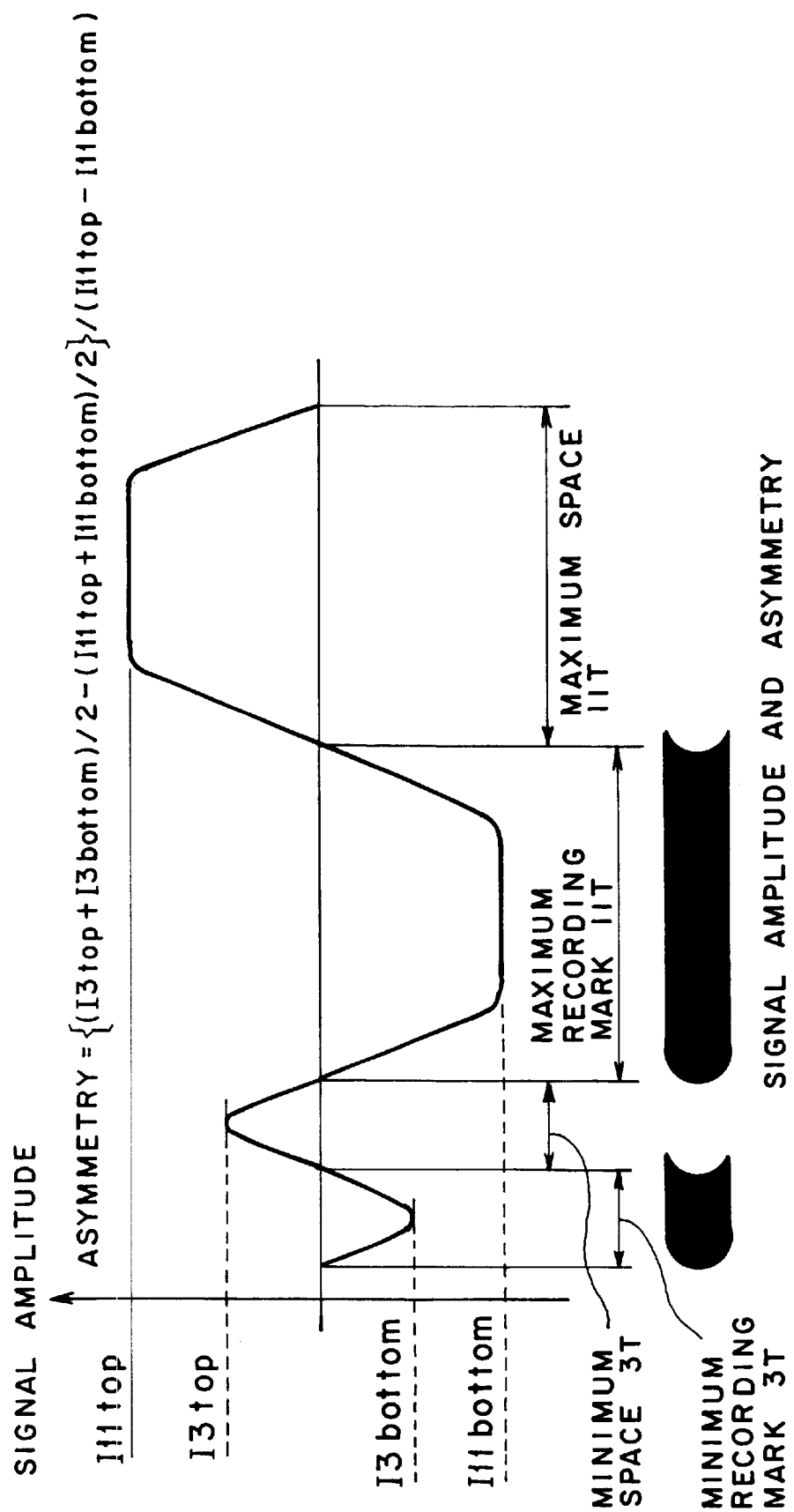
FIG. 4 is a diagram showing the relationship between the signal amplitude and "Asymmetry": thereof in the present invention.
Figure 13:
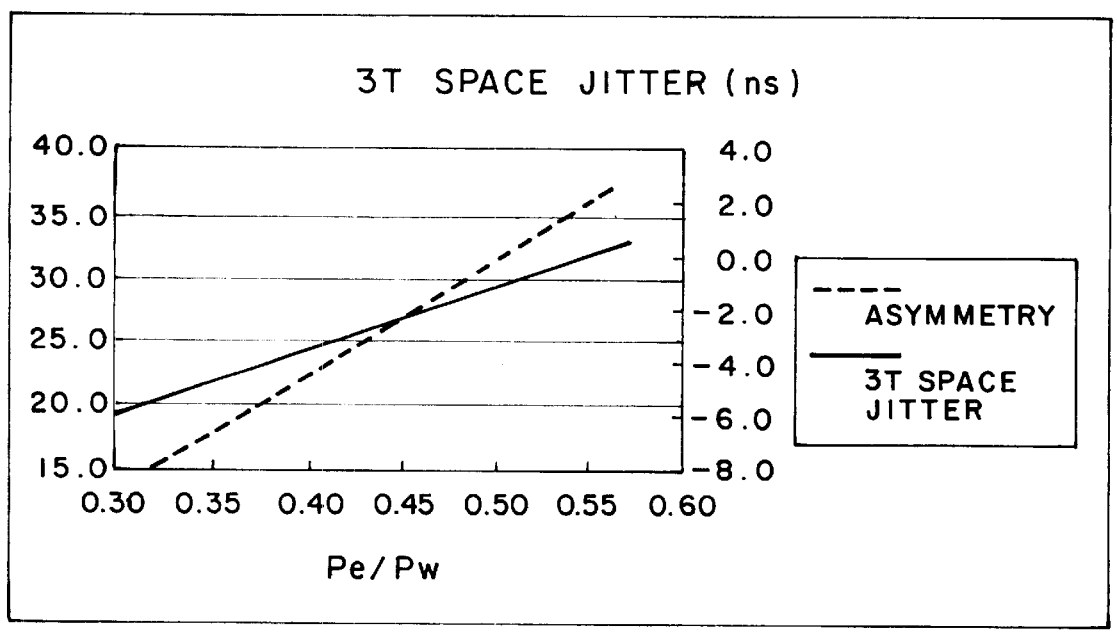
FIG. 13 is a graph showing the relationship between the Pe/Pw and the signal characteristics thereof in the present invention.

FIG. 13 is a graph showing the relationship between the Jitter with a minimum space corresponding to an EFM signal, which is a modified signal of CD, and the ratio of an erasing power to a recording power, Pel/Pwl, dotted with the Jitter as ordinate and the ratio as abscissa. Generally, the Jitter is used as a criterion for evaluating the recording quality. When the value of the Jitter is 35 ns or more, the recording quality is considered to be no good, However, when the differences between various recording apparatus and changes in ambient conditions for recording are taken into consideration, it is preferable that the value of the Jitter be 30 ns or less. The Jitter of the minimum space decreases as the ratio of Pel/Pwl decreases. Therefore, it is preferable that the ratio of Pel/Pwl at the low line velocity of 1×1 be made smaller than the ratio of Peh/Pwh at the higher line velocities of 2× and 4×. It is preferable that the ratio of Pel/Pwl at the low line velocity be in the range of 0.3 to 0.5. Further, when the ratio of Pel/Pwl at the low line velocity of 1× becomes less than 0.3, the Asymmetry characteristics of the signals decrease to −10.0% or less. The Asymmetry characteristics are such characteristics that indicate a balance between the length of the recording mark and the length of the space. It is preferable that the Asymmetry be in the range of +5% to −10%. The Asymmetry can be defined as follows as shown in FIG. 4:

$$\text{Asymmetry} = \{(13\text{top}+13\text{bottom})/2 - (111\text{top}+111\text{bottom})/2\} / (111\text{top}-111\text{bottom})$$

where $(13\text{top}+13\text{bottom})/2 - (111\text{top} +111\text{bottom})/2\}$ is the difference between the average of the signal level 13top of the minimum space length and the signal level 13bottom of the minimum mark length, and the average of the signal level 111top of the maximum space length and the signal level 111bottom of the maximum mark length.

Other features of this invention will become apparent in the course of the following description of exemplary embodiments, which are given for illustration of the invention and are not intended to be limiting thereof.

EXAMPLES

Examples of phase-change multi-speed optical information recording media CD-RW of the present invention have effective recording line velocities of 1×line velocity to 4×line velocity. The recording layer thereof comprises as constituent elements Ag, In, Sb, Te and N, and the respective composition ratios thereof in terms of atomic % are $\alpha=4$, $\beta=7$, $\gamma=58$, $\delta=29$ and $\epsilon 2$.

As the substrate for the CD-RW was employed a disk-shaped plate made of polycarbonate with guide grooves with a width of 0.5 μm.

Figure 14:
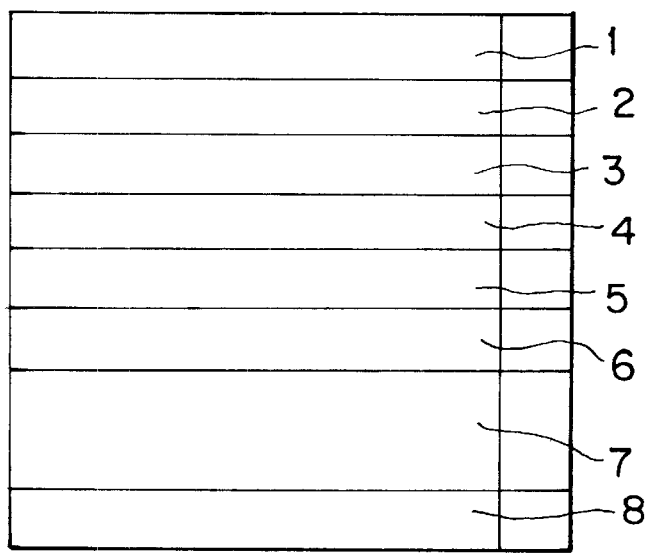
FIG. 14 is a schematic cross-sectional view of a recording medium CD-RW of the present invention, showing the layer structure thereof.

Examples of phase-change multi-speed optical information recording media CO-RW of the present invention and comparative examples thereof were fabricated with the layer structure as illustrated in FIG. 14.

On the above-mentioned substrate 7, the following layers were successively overlaid: a first protective layer 6 made of ZnS and $SiO_2$ with a thickness of 1000 Å, a recording layer 5 with a thickness of 200 Å, a second protective layer 4 made of ZnS and $SiO_2$ with a thickness of 300 Å, and a reflection and heat dissipation layer 3 made of an aluminum alloy with a thickness of 1500 Å by use of a sputtering apparatus.

On the back side of the substrate 7, a hard coat layer 8 with a thickness of 5 μm was formed, using an ultraviolet-curing resin for protecting the substrate 7 as shown in FIG. 14.

On the reflection and heat dissipation layer 3, an overcoat layer 3 with a thickness of 10 μm was formed, whereby a phase-change optical disk was fabricated.

The thus fabricated phase-change optical disk was subjected to crystallization treatment for the recording layer 5 of the optical disk, using an initializing apparatus equipped with a large diameter LD.

A printed layer 1 was then provided on the overcoat layer 2, whereby an example of the phase-change multi-speed optical information recording medium CD-RW was prepared.

The above prepared phase-change multi-speed optical information recording medium CD-RW was subjected to the following recording tests, with the formation of recording marks as shown in FIG. 1A at a 1×recording line velocity, with respect to 3T Space Jitter corresponding to the non-uniformity of the minimum space length after 500 times overwrites, with the signal amplitudes as shown in FIG. 1B.

The results are shown in TABLE 1.

TABLE 1

|  | Recording Velocity | W1/W2 | (Itop-Ibtmf)/ (Itop-Ibtme) | 3T Space Jitter after 500 times overwrites |
|---|---|---|---|---|
| Ex. 1-1 | 1x Write | 1.1 | 1.03 | 34 ns |
| Ex. 1-2 | 1x Write | 1.4 | 1.10 | 30 ns |
| Comp.Ex. 1 | 1x Write | 1.0 | 1.0 | 41 ns |

In the phase-change multi-speed optical information recording medium CD-RW with W1/W2 being 1.0 as in Comparative Example 1, 3T Space Jitter was as large as 41 ns, exceeding an appropriate Jitter of 35 ns.

However, when W1/W2 was increased to 1.1 as in Example 1-1, 3T Space Jitter decreased to 34 ns.

Furthermore, when W1/W2 was increased to 1.4 as in Example 1-2, 3T Space Jitter further decreased to 30 ns, so that writing-of high quality recording signals was successfully achieved.

Furthermore, when the ratio of the signal amplitudes of (Itop–Ibtmf)/(Itop–Ibtme) was 1.0 as in Comparative Example 1, 3T Space Jitter was as large as 41 ns. However, as the ratio of (Itop–Ibtmf)/(Itop–Ibtme) was increased, 3T Space Jitter was decreased. Furthermore, when the ratio of (Itop–Ibtmf)/(Itop–Ibtme) was increased up to 1.10 as in Example 1-2, it was possible to decrease 3T Space Jitter down to 30 ns.

The above prepared phase-change multi-speed optical information recording medium CD-RW was then subjected to tests concerning the relationship between the mechanical characteristics of the CD-RW and the BLER of the recording apparatus used in practice. The results are shown in TABLE 2.

TABLE 2

|  | Recording speed | Curvature (μm) | Difference between inner TILT and outer TILT (deg) | Difference between inner BLER and out BLER of Recording Apparatus used |
|---|---|---|---|---|
| Ex. 2-1 | 1x Write | 14 | 0.022 | 80 |
| EX. 2-2 | 1x write | 62 | 0.165 | 41 |
| Ex. 2-3 | 1x Write | 138 | 0.235 | 52 |
| Comp.Ex. 2-1 | 1x Write | −38 | −0.138 | 214 |
| Comp.Ex. 2-2 | 1x Write | 160 | 0.321 | 101 |

When the curvature was −38 μm and the difference between the inner TILT and the cuter TILT (hereinafter referred to as the inner and outer TILT difference) was −0.138 de gas in Comparative Example 2-1, the difference between the inner BLER and the outer BLER (hereinafter referred to as the inner.and outer BLER difference) of the recording apparatus used was 214.

In contrast to this, when the curvature was adjusted to 14 μm and the inner and outer TILT difference was 0.022 deg as in Example 2-1, it was possible to reduce the inner and outer BLER difference of the recording apparatus to 80, whereby the in-plane uniformity of the signals can be improved.

However, when the curvature was 160 μm and the inner and outer TILT difference was more than 0.320 deg as in Comparative Example 2-2, it was confirmed that the inner and outer BLER difference of the recording apparatus exceeded 100.

The above prepared phase-change multi-speed optical information recording medium CD-RW was then subjected to tests concerning the relationship between the changes in the layout of the guide groove for recording and the actual operation of the recording apparatus used in practice, using the recording media CD-RM with the layout-changed guide grooves. The results are shown in TABLE 3.

TABLE 3

|  | Ex. 3-1 | Ex. 3-2 | Ex. 3-3 | Ex. 3-4 | Comp. Ex. 3 |
| --- | --- | --- | --- | --- | --- |
| Storage capacity (min) | 80 | 80 | 80 | 80 | 74 |
| Recording velocity (m/s) | 1.20 | 1.20 | 1.20 | 1.20 | 1.30 |
| Track pitch of guide groove for recording ($\mu$m) | 1.49 | 1.49 | 1.45 | 1.50 | 1.60 |
| Read-in start diameter (mm) | 46.3 | 45.6 | 46.2 | 46.0 | 45.8 |
| Read-out start diameter | 115.8 | 115.5 | 115.7 | 116.2 | 116.O |
| Actual Operation | Good | Good | Good | Good | Good |

From the above results shown in TABLE 3, it was confirmed that the recording media CD-RW with the large storage capacity, prepared under the conditions that the track pitch of the guide groove for recording was in the range of 1.45 $\mu$m to 1.50 $\mu$m, the read-in start diameter was in the range of 45.6 mm to 46.3 mm, and the read-out start diameter was in the range of 116.2 mm or less, as in Examples 3-1 to 3-4, are compatible with commercially available recording and reproduction apparatus, without causing any problems in terms of operation in practice.

The phase-change multi-speed optical information recording medium CD-RW in Comparative Example 3 was a conventional one with an ordinary storage capacity.

The above prepared phase-change multi-speed optical information recording medium CD-RW was further subjected to tests concerning the relationship between the depth of the guide groove for recording formed in the substrate thereof and the initial recording signal characteristics of the recording medium CD-RM. The results are shown in TABLE 4.

TABLE 4

|  | Recording velocity | Depth of guide groove for Recording (Å) | Push-Pull | Rtop (%) |
| --- | --- | --- | --- | --- |
| Ex. 4-1 | 1x Write | 300 | 0.082 | 21.2 |
| Ex. 4-2 | 1x Write | 320 | 0.086 | 20.5 |
| Ex. 4-3 | 1x Write | 400 | 0.105 | 19.0 |
| Ex. 4-4 | 1x Write | 450 | 0.155 | 18.1 |
| Comp. Ex. 4 | 1x Write | 500 | 0.123 | 16.9 |

The above results indicate that when the depth of the guide groove for recording was 300 Å or more, the Push-Pull could be guaranteed to be 0.082 or more. When the depth of the guide groove for recording was increased, the Push-Pull signal was increased, but the reflectivity was decreased, and when the depth of the guide groove for recording was further increased to 400 Å or more, the reflectivity was further decreased to 19% or less. When the depth of the guide groove for recording still further increased to more than 450 Å, the reflectivity was decreased to 18% or less.

The above prepared phase-change multi-speed optical information recording medium CD-RW was further subjected to tests concerning the relationship between the thickness of the recording layer thereof and the BLER of the recording and reproduction apparatus used in practice. The results are shown in TABLE 5.

TABLE 5

|  | Recording velocity | Thickness of recording layer (Å) | BLER at initial recording | BLER after 100 times overwrites |
| --- | --- | --- | --- | --- |
| Ex. 5-1 | 1x Write | 180 | 96 | 42 |
| Ex. 5-2 | 1x Write | 210 | 31 | 110 |
| Ex. 5-3 | 1x Write | 230 | 17 | 145 |
| Ex. 5-4 | 1x Write | 250 | 6 | 199 |

The above results indicate that when the thickness of the recording layer was in the range of 180 Å to 250 Å, the BLER at the initial recording was less than 100, whereby it was confirmed that excellent recording and reproduction were achieved when the thickness of the recording layer in the above-mentioned range. After 100 times overwrites, the thicker the recording layer, the greater the BLER. However, even in this case, the BLER was still less than 200, so that sufficient recording and reproduction performance for use in practice were exhibited.

The above prepared phase-change multi-speed optical information recording medium CD-RW was further subjected to tests concerning the relationship between the ratio of the erasing power Pe to the recording power Pw, that is, Pe/Pw, and the recording signals. The results are shown in TABLE 6.

TABLE 6

|  | Recording velocity | Pw | Pe/Pw | 3T Space Jitter (ns) | Asymmetry (%) |
| --- | --- | --- | --- | --- | --- |
| Ex. 6-1 | 1x Write | 13.1 | 0.30 | 22.2 | −8.5 |
| Ex. 6-2 | 1x Write | 13.1 | 0.35 | 24.1 | −7.6 |
| Ex. 6-3 | 1x Write | 13.1 | 0.40 | 26.1 | −5.6 |
| Ex. 6-4 | 1x Write | 13.3 | 0.50 | 19.6 | 1.3 |
| Ex. 6-5 | 1x Write | 13.6 | 0.50 | 24.0 | −2.3 |
| Comp. Ex. 6 | 1x Write | 13.1 | 0.50 | 32.0 | 0.4 |

The above results indicate that 3T Space Jitter at the initial recording can be reduced from 32.0 to 22.2 by changing the ratio of Pel/Pwl from 0.50 to 0.30, whereby it was confirmed that excellent signal characteristics were obtained when Pel/Pwl was set at 0.30.

Japanese Patent Application No. 11-317526, filed Nov. 8, 1999, is hereby incorporated by reference.

What is claimed is:

1. A phase-change optical information recording medium which comprises a substrate and a recording layer provided on said substrate, said recording layer comprising a phase-change recording material capable of recording information, reproducing recorded information, and erasing recorded information reversibly with reversible phase changes in said phase-change recording material, with successive formation of a recording mark with a low reflectivity and a length of at least one unit extending in an optical recording scanning direction, and a space with a high reflectivity and a length of at least one unit extending in said optical recording scanning direction, wherein information is recorded by a plurality of signals being recorded in said recording layer, each signal constituting a recording mark area including a recording initiation marking portion with (a) a length of at least two times a minimum length of said recording mark and (b) a width (W1) of at least 1.1 times an average width (W2) of the other portion of said recording mark area.

2. The phase-change optical information recording medium as claimed in claim 1, wherein said space, when having a maximum length in terms of said unit, has a signal level Itop, said recording initiation marking portion has a signal level Ibtmf, and said other portion of said recording mark area has a signal level Ibtme, which signal levels Itop, Ibtmf and Ibtme satisfy the formula I:

$$Itop-Ibtmf \leq (Itop-Ibtme).$$

3. The phase-change optical information recording medium as claimed in claim 1, wherein said phase-change recording material for said recording layer comprises constituent elements Ag, In, Sb, Te, and N or O, with the respective composition ratios $\alpha$, $\beta$, $\gamma$, $\delta$ and $\epsilon$, in terms of atomic % being:

$0 < \alpha \leq 10$ $3 \leq \beta \leq 15$ $50 \leq \gamma \leq 65$ $20 \leq \delta \leq 35$ $0 \leq \epsilon \leq 10$, wherein $\alpha+\beta+\gamma+\delta+\epsilon=100$.

4. The phase-change optical information recording medium as claimed in claim 2, wherein said phase-change recording material for said recording layer comprises constituent elements Ag, In, Sb, Te, and N or O, with the respective composition ratios $\alpha$, $\beta$, $\gamma$, $\delta$ and $\epsilon$, in terms of atomic % being:

$0 < \alpha \leq 10$ $3 \leq \beta \leq 15$ $50 \leq \gamma \leq 65$ $20 \leq \delta \leq 35$ $0 \leq \epsilon \leq 10$, wherein $\alpha+\beta+\gamma+\delta+\epsilon=100$.

5. The phase-change optical information recording medium as claimed in claim 1, wherein said information is recorded in said phase-change recording material with a different recording line velocity which is either a high recording line velocity or a low recording line velocity, said high recording line velocity being at least 1.2 times said low recording line velocity, said low recording line velocity being any of (1) 1.2 m/s to 1.4 m/s, (2) 2.4 m/s to 2.8 m/s, or (3) 4.8 m/s to 5.6 m/s.

6. The phase-change optical information recording medium as claimed in claim 1, wherein said phase-change optical information recording medium is in the shape of a disk, including a disk-shaped signal recordable area with a diameter of 120 mm or less, which is rotatable round a central rotation axis, with a difference between (1) a displacement in the vertical direction of said central rotation axis of an innermost circumference of said disk-shaped signal recordable area and (2) a displacement in the vertical direction of said central rotation axis of an outermost circumference of said disk-shaped signal recordable area being in a range of 10 μm to 160 μm.

7. The phase-change optical information recording medium as claimed in claim 6, wherein said phase-change optical information recording medium is in the shape of a disk, including a disk-shaped signal recordable area with a diameter of 120 mm or less, which is rotatable round a central rotation axis, wherein when there is formed a TILT angle ($\theta$1) is formed between (1) a flat surface which is positioned with a right angle with respect to said central rotation axis, passing through an inner tangent point on one external surface of said disk-shaped recording medium, which inner tangent point corresponds to a point at said innermost circumference of said disk-shaped signal recordable area, and (2) a tangent at said inner tangent point externally directed in a radius direction of said disk-shaped recording medium, and also when there is formed a TILT angle ($\theta$2) is formed between (1) said flat surface and (3) a tangent at an outer tangent point, which outer tangent point corresponds to a point at said outermost circumference of said disk-shaped signal recordable area, externally directed in said same radius direction as mentioned above of said disk-shaped recording medium, an average difference between said TILT angle ($\theta$1) and said TILT angle ($\theta$2) is in a range of −0.050° to 0.320°, provided at least one of said TILT angle ($\theta$1) or said TILT angle ($\theta$2) can be at zero.

8. The phase-change optical information recording medium as claimed in claim 6, wherein said substrate comprises guide grooves for recording signals in said phase-change recording material, said guide grooves having a pitch of 1.43±0.3 μm.

9. The phase-change optical information recording medium as claimed in claim 6, wherein said disk-shaped recording medium has a read-in radius in a range of 45.6 mm to 46.2 mm, and a read-out radius of 116.2 mm or less.

10. The phase-change optical information recording medium as claimed in claim 6, wherein said substrate comprising guide grooves for recording signals in said phase-change recording material, said grooves having a depth of 180 Å to 250 Å.

11. The phase-change optical information recording medium as claimed in claim 1, wherein said substrate further comprises guide grooves for recording signals in said phase-change recording material, and said recording medium further comprises a first protective layer on said substrate, on which first protective layer, there are successively overlaid said recording layer, a second protective layer and a reflection layer, and said recording layer has a thickness of 180 Å to 250 Å.

12. The phase-change optical information recording medium as claimed in claim 1, wherein said information is recorded in said phase-change recording material with a different recording line velocity which is either a high recording line velocity or a low recording line velocity, said recording with said low recording line velocity being carried out with such a ratio of an erasing power Pel to a recording power Pwl, that is, Pel/Pwl, being smaller than a ratio of an erasing power Peh to a recording power Pwh, that is, Peh/Pwh, at the time of recording carried out with said high recording line velocity.

13. The phase-change optical information recording medium as claimed in claim 12, wherein said ratio of Pel/Pwl at said low recording line velocity is in the range of 0.3 to 0.5 (0.3≤Pel/Pwl≤0.5).

* * * * *